United States Patent [19]

Feldmann

[11] Patent Number: 4,522,685
[45] Date of Patent: Jun. 11, 1985

[54] METHOD OF OPERATING A SPENT PULPING LIQUOR COMBUSTION APPARATUS

[75] Inventor: Herman F. Feldmann, Worthington, Ohio

[73] Assignee: International Paper Company, New York, N.Y.

[21] Appl. No.: 458,237

[22] Filed: Jan. 17, 1983

[51] Int. Cl.³ .............................................. D21C 11/12
[52] U.S. Cl. ................................ 162/30.11; 162/30.1;
162/36; 162/47; 423/DIG. 3
[58] Field of Search ...................... 162/30.1, 30.11, 36,
162/47; 423/207, DIG. 3

[56] References Cited
U.S. PATENT DOCUMENTS

| | | | |
|---|---|---|---|
| 3,309,262 | 3/1967 | Copeland et al. | 162/30.11 |
| 3,322,492 | 5/1967 | Flood | 162/30.11 |
| 3,574,051 | 4/1971 | Shah | 162/30.11 |
| 4,303,469 | 12/1981 | DiNova et al. | 162/30.11 |

Primary Examiner—William Smith
Assistant Examiner—K. M. Hastings
Attorney, Agent, or Firm—Royal E. Bright

[57] ABSTRACT

Operation of a multiple solids fluidized-bed black liquor combustor employing only combustion residue solids as both fine and coarse bed solids is disclosed. Under normal operating conditions, a solids distribution of fine particle sizes and coarse particle sizes with a minimal population of intermediate particle sizes is maintained. Heat and chemical values are readily recovered from the black liquor and the necessity for separation of the combustion residue salts from inert fluidized-bed solids is avoided.

7 Claims, 3 Drawing Figures 4,522,685

METHOD OF OPERATING A SPENT PULPING LIQUOR COMBUSTION APPARATUS

BACKGROUND OF THE INVENTION

This invention relates to a method and apparatus for recovery of heat and chemical values from spent lignocellulosic pulping liquors, more specifically, the recovery of said heat and chemical values from spent Kraft pulping or black liquor through the use of multiple solids fluidized-bed combustion systems.

DISCUSSION OF RELEVANT ART

Nack et al. in U.S. Pat. No. 4,084,545 describe and claim a method of operating a fluidized-bed system wherein two discrete particle sizes and/or densities are employed with the larger (heavier) particles being retained in the fluidized-bed system and the finer (lighter) particles being circulated through an external heat exchanger. The fuel described is high sulfur coal and at least one of the particle population may be made up of reactants for the sulfur. Other carbonaceous fuels are mentioned but the particle populations are either inert or reactive with a constituent of the fuel. Recirculation of combustion residues to provide one or both particle populations is not suggested.

DiNovo et al. in U.S. Pat. No. 4,303,469 describes the combustion of and recovery of chemical and heat values from spent pulping liquor, primarily Kraft black liquor in a system analogous to that of Nack et al. The bed particle populations described comprise inert materials which are not contemplated to include salts generated in the combustion process.

Flood in U.S. Pat. No. 3,322,492 describes a completely different recovery system wherein Kraft black liquor is dried to granules in a fluidized-bed reactor under conditions wherein $SO_2$ formed later in the process is reacted with some $Na_2CO_3$ to form $Na_2SO_4$. The dried granules comprising $Na_2SO_4$, $Na_2CO_3$, and dried organic matter are carried to a second bed wherein the organic matter is combusted with a less than stoichiometric quantity of air to provide a reducing atmosphere for reduction of sulfate to sulfide. $H_2S$ formed by reaction with residual moisture is carried off and later oxidized to $SO_2$ which is returned to the first fluidized-bed drier for reaction with $Na_2CO_3$. The system described is entirely different from that contemplated by the instant invention and while the distribution of particle sizes in the bed systems is not discussed, it may reasonably be assumed to approximate the normal Maxwell-Boltzmann or bell-shaped curve.

U.S. Pat. application Nos. 342,954 filed Jan. 26, 1982, now abandoned, and Ser. No. 400,492 filed July 21, 1982, now U.S. Pat. No. 4,441,959 are directed to improvements on the DiNovo patent and disclose the possibility of employing combustion salt residues of Kraft black liquor as one of the inert solids in the fluidized-bed of the combustor, principally the smaller size (lighter) recirculating particle phase. Neither teaches or suggests operation of the fluidized-bed reactor employing only combustion residue salts as both large and small particles.

Use of the DiNovo et al. process and apparatus for the recovery of Kraft black liquors requires that the inert bed solids be separated more or less completely from the salts resulting from liquor combustion. While with proper equipment design this may be accomplished, elimination of the separation requirement permits a much simplified apparatus and process to be employed.

As explained in both the Nack and DiNovo patents above, successful operation of the process requires that the combustion contain a fluidized-bed system containing two distinct particle populations. The first, a population of small or light particles which essentially occupies the free space in the reactor not occupied by the second denser or larger particle bed, interpenetrates that bed and is removed from the top of the reactor, passed through an external fluidized-bed heat exchanger for temperature control and/or heat energy recovery and is then returned to the lower portion of the combustor. A minimal population of particles of intermediate sizes or densities between the mean particle sizes or densities of the two beds is contemplated and has proven necessary for successful operation of this type of system.

Without any reason to believe differently, one would expect the residual salt produced by the combustion of black liquor, under any conditions where solid particles are formed, to have particle sizes ranging about a single average size and for the overall distribution of sizes of particles formed to resemble the classical Maxwell-Boltzmann or bell-shaped curve.

Surprisingly, this has not proven to be true in practice and, in fact, the combustion residue salts under normal operating conditions of the fluidized-bed combustor system provide two discrete population sizes. One consists of relatively coarse prills of a size suitable for maintaining the large particle fluidized-bed and the second comprises relatively small particles suitable for maintaining the small particle size bed. Very few intermediate size particles agglomerating from small to large sizes are found at any given time in the fluidized-bed combustor.

SUMMARY OF THE INVENTION

The invention provides a process for the recovery of energy and chemical values from spent pulping liquor which comprises an initial stage of subjecting concentrated spent pulping liquor to combustion with air in a fluidized-bed reaction chamber, said chamber providing:

(a) an entrained fluidized-bed in a first space region containing a first relatively fine solid bed particle consisting substantially of combustion residue salts of spent pulping liquor combustion in air;

(b) in a second more limited space region within the first region a second relatively dense fluidized-bed containing a relatively coarse solid bed particle component consisting substantially of combustion residue salts of spent pulping liquor combustion in air;

(c) a recirculation path for the first particle component from the first space region through the dense fluidized-bed in the more limited space region, and said first and second fluidized-beds containing a minimal quantity of particle sizes intermediate between the average particle size of said first fluidized-bed and the average particle size of said second fluidized-bed.

This process aspect of the invention provides a method for the controlled combustion of spent pulping liquor while maximizing the efficiency of energy and chemical value recovery and having substantial operating flexibility with improved ease of control of emissions. Special mention is made of processes wherein the spent pulping liquor is Kraft black liquor, wherein the recirculation path for the fine particle solids is external to the combustor, wherein said external recirculation path comprises a fluidized-bed heat exchanger, wherein a portion of the fine particle solids is removed from the external recirculation path and at least a portion of said removed fine particle solids is then subjected to chemical reduction, wherein a portion of the dense particle solids is removed from the fluidized-bed combustor and at least a portion of said removed dense particle solids is subjected to chemical reduction and wherein a portion of both the fine and dense particle solids are removed and a portion of said removed solids is thereafter subjected to chemical reduction.

The invention also provides in a multiple solids fluidized-bed combustor wherein concentrated spent pulping liquor is subjected to combustion with air in a fluidized-bed reaction chamber provided with a plurality of solid particulate materials at least one of which is of finer particle size than another, the improvement comprising the said solid particulate materials consisting substantially of solid products of combustion of said spent pulping liquor in air.

DESCRIPTION OF THE PREFERRED EMBODIMENT

The manner of practicing the process of the invention will now be illustrated with reference to the drawings and to a specific embodiment thereof, namely the recovery of Kraft black liquor.

Kraft black liquor, as it is removed as an effluent in the pulping of wood in a paper making plant, is normally of relatively low solids concentration, containing usually approximately 14 percent by weight of solids. In the practice of the process of the invention, this liquor is desirably concentrated to a total solids content of at least 50 percent and desirably between about 50 and 100 percent by weight of solids, preferably about 60 to 85 percent by weight. This may be accomplished by treating the Kraft black liquor as it leaves the pulping operation in multiple effect evaporators (1) to remove a large proportion of the water and increase the total solids content.

In normal operation, the effluent from the multiple effect evaporators (1) has a total solids content of about 65 percent by weight and has had its temperature increased to about 150° to 230° F., desirably about 180° F. to 200° F., where it is passed through conduit (2) into initial fluidized-bed reactor (3), near the lower end of the reactor. In accordance with the preferred embodiment of this invention, the fluidized-bed reactor is a multiple solids fluidized-bed reactor of the type disclosed in Nack, et al., U.S. Pat. No. 4,084,545, granted Apr. 18, 1978. See FIG. 2 of the drawings of that patent and the relevant specification. The general process is described in DiNovo, et al., U.S. Pat. No. 4,303,469 granted Dec. 1, 1981.

Figure 2:
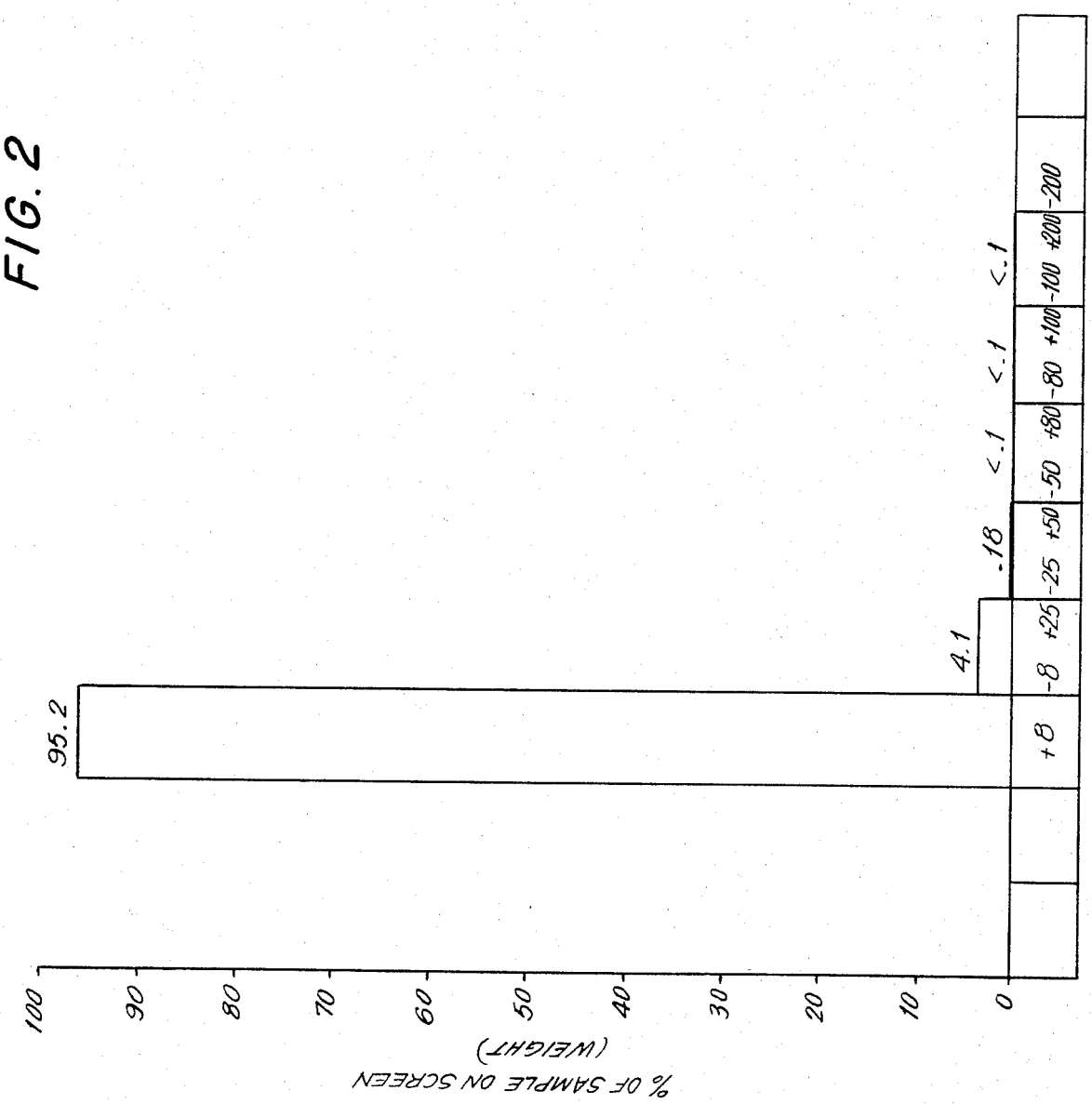
FIG. 2: Is a graph illustrating the particle size distribution typically found in the dense bed portion of the fluidized-bed combustor.
Figure 3:
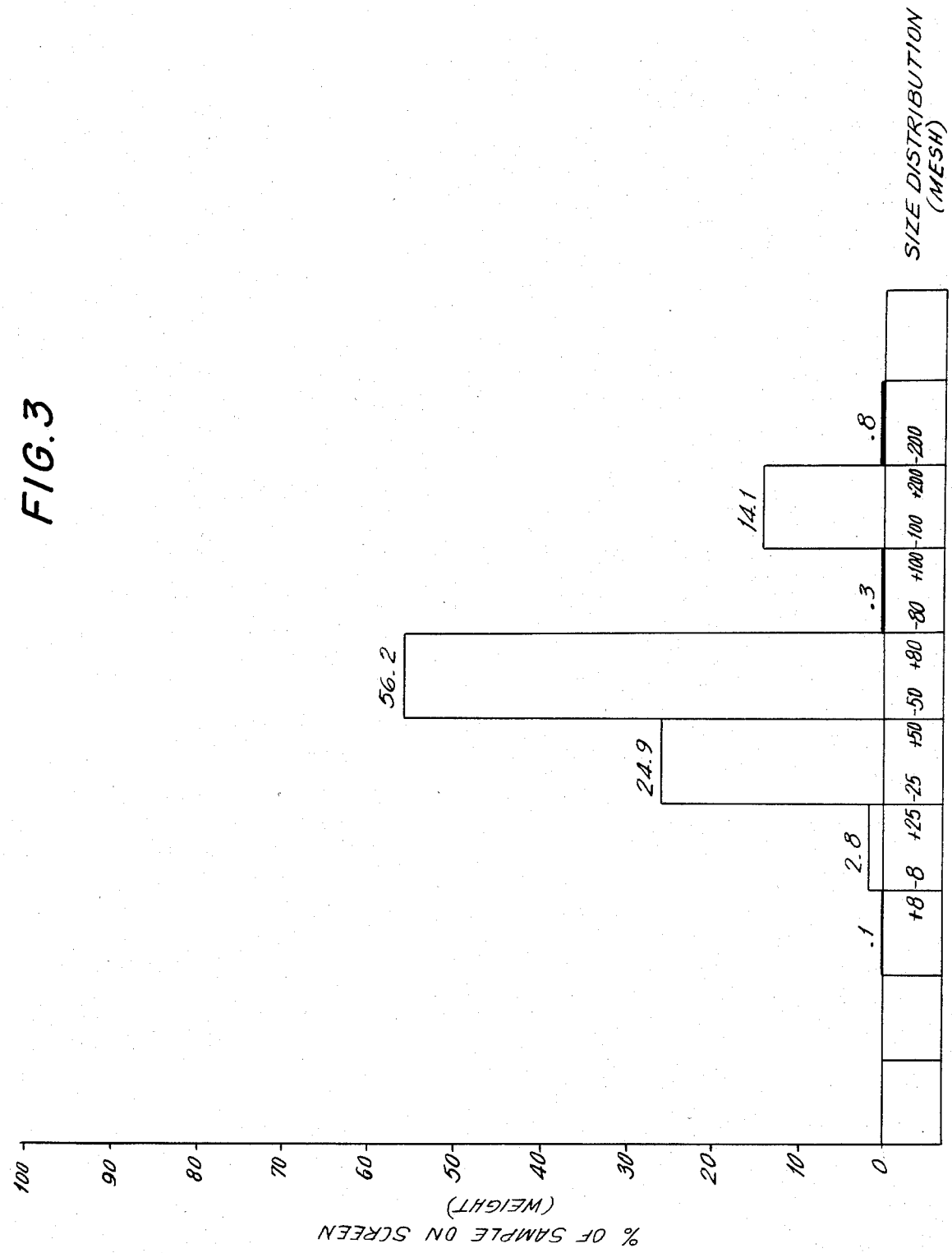
FIG. 3: Is a graph illustrating the particle size distribution typically found in the fine particle size fluidized-bed in the fluidized combustor.
Figure 1:
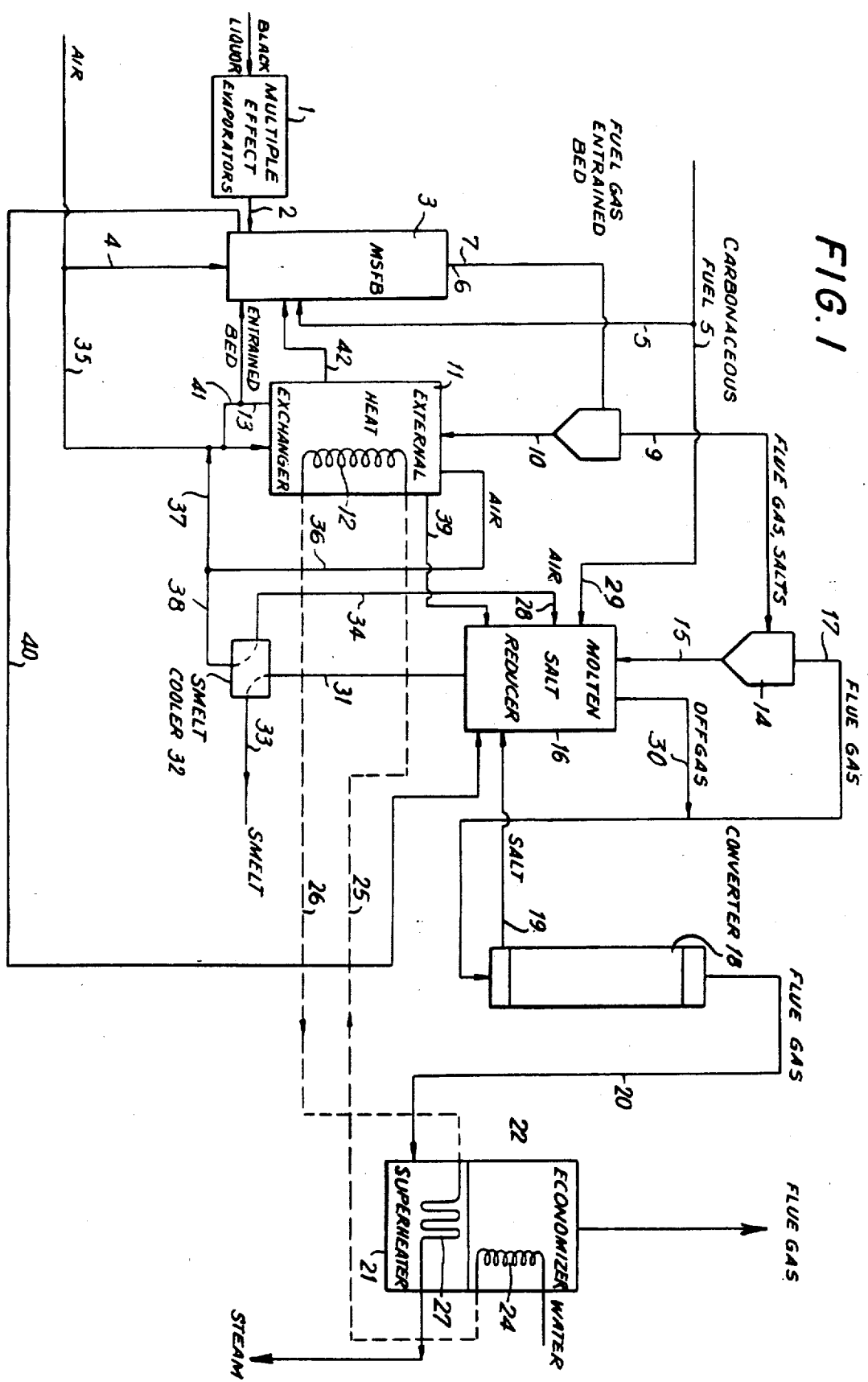

The multiple solid fluidized-bed reactor (3) is operated with a plurality of solids present, as described in those patents. In accordance with the invention, the solids present are comprised substantially of the salts, principally sodium carbonate and sodium sulfate, formed on combustion of the black liquor with air. As shown in FIG. 3, the finer (lighter) or entrainable solid particles are substantially of $-25$ to $+200$ mesh U.S. sizes; that is, the particles will pass through a 25 mesh screen but not through a 200 mesh screen. Minor proportions of greater than 25 mesh and smaller than 200 mesh size may also be present. As shown in FIG. 2, the coarse (heavier), non entrainable particles are substantially of greater than $+8$ mesh U.S. size with minor proportions of particles smaller than 8 mesh.

Into the fluidized-bed reactor (3) there is also introduced air at ambient or elevated temperature through the bottom of the reactor as shown at (4) along with optional carbonaceous fuel, for example, at or near the bottom of the reactor as shown at (5), together with concentrated black liquor which also enters the reactor near the bottom as shown at (2). The amount of air, concentrated black liquor and any carbonaceous fuel may be adjusted to provide for combustion, preferably to about 80 to 90 percent completeness, based on carbon content, of the black liquor and any carbonaceous fuel, while yet suspending all solids present. The gaseous products of the combustion process comprise primarily carbon dioxide, nitrogen and water vapor, but also comprise small amounts of carbon monoxide, hydrogen and methane. The inorganic or mineral content of the black liquor is converted to sulfate and carbonate salts, normally sodium sulfate and sodium carbonate. If the combustion of organic material in the combination of black liquor and any optional carbonaceous fuel is intended to be incomplete, carbonaceous materials, including carbon, are produced. Desirably sufficient combustion takes place to generate a temperature within the fluidized-bed reactor (3) of between about 1100° and 1300° F., preferably from about 1150° F. to about 1250° F. In this temperature range, the non-gaseous combustion products are solids. The superficial velocity of the air introduced is adjusted to about 15 to about 30 feet per second, preferably from about 20 to about 30 feet per second, so as to permit entrainment of the fine particle solids newly produced by black liquor combustion in the reactor (3) and most of the solid carbonaceous material. These solids escape out the top (6) of the fluidized-bed reactor (3). The combined entrained solids are transferred through conduit (7) into gas solids separator (8) which separates most of the solids from the combustion residue gases which retain some fine particle solids and solid carbonaceous material. The gaseous materials, consisting primarily of carbon dioxide, nitrogen and water vapor and the small amount of entrained solids, are removed from the top of gas solids separator (8) through conduit (9). The major portion of the fine particle solids and carbonaceous material is removed from gas solids separator (8) through conduit (10). The solids transferred from the gas solids separator (8) through conduit (10) are initially desirably at a temperature of between about 1100° and 1300° F., preferably from about 1150° F. to about 1250° F.

The solids pass from separator (8) through conduit (10) into heat exchanger (11) whereby a portion of the heat of the solids is exchanged into a tube (12) containing water, producing steam. The heat exchanger (11) is a conventional unit employed in combination with a conventional fluidized-bed whereby the tube (12) provides the role of a heat removal component. The solids, having surrendered a good portion of their heat are removed from the heat exchanger (11) through conduit (13) and returned into the bottom of multiple solids fluidized-bed reactor (3) to be recycled there through.

The gaseous component removed from the gas solids separator (8) through conduit (9) containing the remaining entrained solids and the combustion gaseous from reactor (3) may be passed through a second gas solids separator (14) where additional separation of the major portion of the remaining entrained solids is made. These solids are removed from the bottom of gas solids separator (14) and may be passed through conduit (15) into optional reducer (16). In the normal operation of the process, the gaseous effluent from gas solids separator (14), passing out of the top thereof and through conduit (17) contains almost no hydrogen sulfide, and is composed mostly of carbon dioxide, nitrogen, moisture, traces of sulfur dioxide, carbon monoxide, hydrogen and methane. These gases having been almost completely separated from, but having some entrained solids, may be transmitted into optional converter (18) which may be a converter of conventional design in which the oxidizable constituents of the effluent from gas solids separator (14) are oxidized adiabatically at about 1450° F. (790°) or at even higher temperatures. In the vicinity of this temperature, substantially complete oxidation of the carbon monoxide, hydrogen and methane by excess oxygen in the gas is very rapid and the minor fraction of entrained combustion salts becomes molten. The molten salts may be drawn off through line (19) and conveyed to optional molten salt reducer (16).

The oxidized gases which now contain substantially no further oxidizable material are exhausted from converter (18) and passed through duct (20) to superheater (21) and economizer (22) before being passed through duct (23) to any desired particulate or other standard pollution control steps and subsequently being exhausted to the environment. Economizer (22) and superheater (21) may be employed to recover heat values by initially heating water in tube (24) in economizer (22), passing this heated water through pipeline (25) to tube (12) in external heat exchanger (11) where the temperatures of the water may be further increased to generate steam. The steam may then be passed through pipeline (26) to tube (27) in superheater (21) wherein the steam may be converted to superheated steam. One skilled in the art will, of course, recognize that hot water from tube (24) and steam from tube (12) will themselves be useful for various industrial operations in a papermill and portions of these may be recovered and used directly without passing into the next heat recovery stage. Both economizer (22) and superheater (21) are well known process equipment. It is preferred that they be designed and operated so that flue gases which leave the converter (18) at about 1450° F. or higher leave the economizer at about 400° F.

One of skill in the art will recognize that optional converter (18) may be omitted. In that event, gases passing through conduit 17 may conveniently be passed directly to a conventional economizer and thence to appropriate solid and gaseous pollution control equipment before being exhausted to the environment. The hot water and steam generating systems would readily be altered to conform to this alternative configuration by one of skill in the art.

In addition to solids introduced into reducer (16) through conduit (15) and molten residual salts from converter (18) introduced through duct (19), excess quantities of fine particle solids greater than required for recycling back to reactor (3) for operating purposes may be removed, preferably before passing through heat exchanger (11) from gas solid separator (8), conduit (10) or the upper portion of heat exchanger (11) and transferred, as illustrated, through conduit (39) to reducer (16).

The optional reducer (16) is a standard furnace or reactor. The purpose of the introduction of air into reducer (16) is to oxidize sufficient amount of uncombusted carbonaceous material, and additional reductant optionally provided through inlet (29) to provide the heat required for reduction of sulfate to sulfide, an endothermic reaction. The remaining uncombusted carbonaceous material and additional reductant are employed in the reduction.

Complete reaction of all such components is not a realistic expectation and some obnoxious gases, especially hydrogen sulfide and other volatile compounds containing sulfur in a negative or reduced formal valence state may remain. To avoid the necessity for provision of other means of removal of the obnoxious gases, conduit (30) may introduce these gases to the flue gas stream in conduit (17) prior to introduction into converter (18). The reducer is desirably operated at a temperature of about 1650° F. The reducer contains a molten mixture of about one to three parts by weight of sodium carbonate and about one part by weight of sodium sulfate and sodium sulfide combined.

The purpose of optional reducer (16) in which a substantial amount of the chemical reduction takes place and which is provided with a means of agitation is to reduce much of the inorganic sulfate salts to sulfides, which are necessary components of Kraft pulping solutions.

As stated above, the uncombusted carbonaceous material and any added reductant, such as, a carbonaceous fuel performs a dual role in the reducer. They perform as a potent chemical reducing agent to reduce sulfate and any thiosulfate to which may be present to sulfide salts and supply heat of combustion due to oxidation with air introduced through inlet (28). The reduction of sulfate to sulfide is an endothermic reaction and heat energy to support this reaction is conveniently supplied by oxidation of part of the carbonaceous material or other reducing agents optionally provided.

The molten solids may be removed from reducer (16) through conduit (31) in which stage the solids are in the form of inorganic sulfides, carbonates and some unreduced sulfates. Conventionally these will be as sodium salts. These molten salts are passed through conduit (31) into smelt cooler (32) wherein some of their heat content is removed to reduce their temperature to the point, about 1400° F. where they can be passed out of the smelt cooler (32) and on through conduit (33) to a conventional smelt dissolving tank for further processing into Kraft white pulping liquor in conventional fashion. Heat recovered in the smelt cooler (32) may be employed to warm air passing through duct (34) to about 1000° F. to about 1300° F. prior to introduction through inlet (28) into reducer (16).

To provide oxygen for the various combustion or oxidation steps in the system and process and fluidizing gas for multiple solids fluidized-bed reactor (3), external heat exchanger (11) and in return duct (13), it is convenient to provide a supply of air to the system. Conveniently, air may be provided through duct (35), a required portion thereof diverted through duct (4) to provide fluidizing gas for fluidizing the bed in multiple solids fluidized-bed reactor (3) and oxygen for the combustion taking place therein. Sufficient air continues through duct (35) to fluidize the solids bed in heat exchanger (11) with a portion thereof being diverted through duct (41) to be passed into return duct (13) to provide smooth flow for fine solids being recycled to reactor (3). Air exits heat exchanger (11) through duct (36) having a substantial heat content. Therefore, a portion of the air in duct (36) is recycled through duct (37) to be reused as fluidizing gas in return duct (13) and heat exchanger (11). The remaining portion of air in duct (36) may be passed through duct (38) into smelt cooler (32) where it is further warmed and passed through duct (34) to inlet (28) where it is introduced into reducer (16) to provide oxygen for the combustion reaction therein.

Thus, by operation of the process, black liquor has had a substantial portion of its organic matter combusted in fluidized-bed reactor (3) optionally while coal or another carbonaceous fuel, such as, petroleum or petroleum coke has been added to provide additional heat value and a supplemental source of uncombusted carbonaceous material for use in the optional reduction processes of reducer (16). After the combustion process, in a sequence of steps, the heat values are recaptured in the form of hot water and steam which in turn are employed directly in other plant processes or indirectly by generating energy in other forms for use in the plant. The mineral components may be recovered to form a conventional green liquor, processable by known conventional techniques for reuse in the pulping operation, and toxic and obnoxious gases are retained within the system until they are converted to compounds acceptable for release or handling by more economical control methods than would be required for control of the toxic and obnoxious gases in their original form. This is facilitated, of course, in the process mode wherein effluent gases from the reducer (16) are recycled through conduit (30) back to conduit (17) and thence to converter (18) for treatment therein.

As stated above, the optional addition of carbonaceous fuel, such as, coal, petroleum or petroleum coke, in addition to providing additional fuel value during the initial combustion process in the initial fluidized-bed reactor (3), permits combustion to be carried out under a wide range of conditions while insuring an ample supply of unburned carbonaceous material as a reduction source in the reduction reaction of reducer (16).

One of skill in the art will recognize that it may be necessary to provide an additional reductant for proper operation of reducer (16) under certain operating conditions of the entire system. Preferred supplemental reductants will be carbon sources, such as, coke, petroleum coke, natural gas, producer gas and the like. Use of such carbon sources as coal directly in reducer (16) will not be preferred because moisture and volatiles present in the coal will interfere with smooth operation of the reducer (16).

The process provides an effective means of solid separation and recovery. Exiting at the top of reactor (3) are flue gas, a portion of the inert bed solids comprising oxidized combustion residue salts to be recovered and reused in the pulping operations, along with uncombusted carbonaceous material to be employed in the reduction process. A substantial portion of the inert bed solids which are entrained in reactor (3) are separated in an initial gas solids separator (8) and the greater portion thus separated is recycled to the reactors (3) through heat exchanger (11) and conduit or duct (13). The flue gas, remaining entrained salts and uncombusted organics are effectively separated by conventional gas solids separation equipment, with the process solids flowing to reducer (16).

The external heat exchanger or boiler (11) serves the important role of recovering heat of combustion as stored in the sensible heat from the separated bed solids, thus, avoiding the necessity of providing heat exchanger tubes directly in reactor (3). In addition to improved and smoother operation of the fluidized-bed combustion zone provided by the absence of heat exchanger tubes therein, corrosion of the heat exchanger tubes is also substantially reduced.

An important optional phase of the process as a whole is the chemical reduction which comprises conversion of sodium sulfate to sodium sulfide which is an important ingredient in the Kraft pulping process. This reduction takes place in reducer (16), as described. Reduction takes place in the lower portion of reducer (16). Air is introduced into the reducer (16) at (28) to oxidize combustible gases, such as, hydrogen and carbon monoxide before they exit the reducer. The air, of course, also performs the important role of oxidizing uncombusted carbonaceous material to provide heat. These reactions are exothermic and provide the thermal energy necessary for supporting the reduction reactions occurring in the reducer which are endothermic.

The particular grade or type of coal, petroleum, petroleum coke or other carbonaceous fuel employed in the process is not particularly critical. Any heavy grade fuel oil or even crude oil may be employed. Similarly any available grade of anthracite, bituminous coal, petroleum coke or even lignite in particle sizes compatible with the means for introduction into the reactor may be employed.

When bituminous coal is employed as fuel, it may be employed at a from 1:5 to 1:100 by weight, preferably about 1:20 by weight ratio to black liquor feed solids.

The combustion process in reactor (3) will be recognized as continually producing combustion salts in excess of the quantity of fine and large particle size salts required in reactor (3), heat exchanger (11) and their interconnecting conduits and gas solids separators to assure stable combustion and adequate heat removal. As stated above, a portion of the fine particle solids entrained and separated in gas-solids separator (8) may be separated prior to their passage through heat exchanger (11) and be transferred, as illustrated by duct (39) to reducer (16) while still retaining a major portion of their heat content, thus providing additional incremental heat to reducer (16). Large particle solids in excess of the quantity needed to maintain the dense bed in reactor (3) may be removed by standard means from the lower portion of reactor (3) and transferred through duct (40) to reducer (16).

As heat exchanger (11) is preferably operated in a fluidized-bed mode, the inlet to return conduit (13) will desirably be situated internally in heat exchanger (11) at some distance above the bottom. As the fluidizing conditions in heat exchanger (11) may not be such as to entrain particles as large as were entrainable from fluidized-bed reactor (3) these larger particles, which may represent a relatively small population of fine particles accreting material to become large particles, may be returned from heat exchanger (11) to reactor (3) by separate return duct (42).

As stated above, one of skill in the art would appreciate that the flow of fine particles in return duct (13) may be facilitated by the introduction of a flow of air into duct (13). The preferred location of the air inlet will vary somewhat depending on the exact configuration of return duct (13). Where return duct (13) is essentially an "L" shaped duct having a round cross section, introduction of air at the base of the vertical leg of the "L" at about or slightly below the midpoint of the horizontal cross section has been found preferable.

Startup of the multiple solids fluidized-bed reactor system naturally requires that the reactor be supplied with an initial change of particles having the correct sizes. This may be provided by charging with inert solids as described in DiNovo U.S. Pat. No. 4,303,469 and gradually purging those solids in favor of the combustion residue salts as operation proceeds. Commercially available $Na_2SO_4$ and $Na_2CO_3$ of the appropriate particle sizes may be provided, or particles of the correct size formed in a similar multiple solids fluidized-bed combustor may be employed.

One of skill in the art will recognize that segregation of the two solid particle phases employed in the fluidized-bed systems described herein may occur because of differences in particle size or in density or a combination thereof. The term finer particle size, therefore, comprehends particles of relatively lesser density and the term larger particle size also comprehends relatively denser particles.

One of skill in the art will recognize that reducer (16) is an optional inclusion in the overall system. If reducer (16) is not employed appropriate modifications to the system and processes will be obvious to one of skill in the art. For example, excess combustion salts and any molten combustion residue from optional converters (18) may be fed to the reducing section of a conventional recovery furnace for reclamation or they may be disposed of in any convenient fashion.

One of skill in the art will recognize that the maximum size of particles which may be entrained depends to a large part on the gas velocity in a particular fluidized bed. Techniques for removing larger particles from a fluidized bed system are well known in the art. Under the conditions described in the example hereinbelow dense bed particles having diameters up to about one-half inch were successfully fluidized.

The following example further illustrates the best mode contemplated by the inventor for the practice of his invention.

EXAMPLE

Following the general procedure set forth above, Kraft black liquor after having been concentrated in multiple effect evaporators (1) to a solids content of from about 53.4% to about 65.2% by weight was injected into initial fluidized-bed reactor (3) near its lower end, at feed rates of between about 190 and about 210 pounds per hour, a rate found to insure smooth operation of the system. The fluidized-bed was initially charged with commercial salts having particle sizes greater than about 100 mesh and the combustor temperature was maintained at about 1175° F. Combustion of black liquor was maintained at a steady state for about 27 hours with removal of excess combustion salts from the combustor system being accomplished by separation of entrained solids at gas solids separator (8) and from the upper portion of heat exchanger (11). The purchased salt particles were gradually replaced during the run with entrained fine particle and dense bed particles typically having the particle size distributions shown in FIGS. 3 and 2 respectively. During the run, the temperature of the entrained salts being cycled to the external heat exchanger was maintained below about 1100° F. preferably about 1000° F. at the heat exchanger, the temperature leaving the heat exchanger was about 600° F., and the air flow through the fluidized-bed combustor was maintained at about 262 scfm or standard cubic feet per minute. Under these conditions, the system operated smoothly and no caking or unwanted agglomeration of salt on equipment surfaces occurred.

The subject matter which applicant regards as his invention is particularly pointed out and distinctly claimed as follows:

1. An integrated process for the recovery of energy and chemical values from spent pulping liquor which comprises an initial stage of subjecting spent pulping liquor concentrated to at least about 50% by weight solids content to combustion with air at temperatures from about 1100 deg. F. to about 1300 deg. F. in a fluidized-bed reaction chamber, said chamber providing:
   (a) an entrained fluidized-bed in a first space region containing a first relatively fine solid bed particle consisting substantially of combustion residue salts of spent pulping liquor combustion in air;
   (b) in a second more limited space region within the first space region, a second relatively dense fluidized bed containing a relatively coarse solid bed particle component consisting substantially of combustion residue salts of spent pulping liquor combustion in air;
   (c) a recirculation path for the first particle component from the first space region through the dense fluidized-bed in the more limited space region, wherein a portion of the fine particle solid is separated and removed from the upper portion of the reaction chamber, conveyed to and passed through a fluidized-bed containing heat-exchanger means for removing heat values from said separated and removed fine particle size solid, and said separated and removed fine particle size solid is subsequently reintroduced into the fluidized-bed reaction chamber below the surface of the relatively dense fluidized-bed;
   (d) said first and second fluidized-beds containing a minimal quantity of particle sizes intermediate between the average particle size of said first fluidized-bed and the average particle size of said second fluidized-bed; and
   (e) fluidizing air provided to fluidize said first and second fluidized-beds at a superficial velocity of from about 15 to about 30 feet per second.

2. A process as defined in claim 1 wherein at least a portion of the separated and removed fine particle solid is again separated and removed prior to passage through the external fluidized-bed and at least a portion of said again separated and removed fine particle solid is subjected to chemical reduction.

3. A process as defined in claim 1 wherein at least a portion of the relatively coarse solid bed particle component is separated and removed from the fluidized-bed reaction chamber and at least a portion of said separated and removed relatively coarse bed solid is subjected to chemical reduction.

4. A process as defined in claim 1 wherein both fine and relatively coarse particle size bed solids are separated and removed from the fluidized-bed reactor and at least a portion of said separated and removed bed solids are subjected to chemical reduction.

5. A process as defined in claim 1 wherein the spent pulping liquor is Kraft black liquor.

6. An improved multiple solids fluidized-bed combustor adapted for subjecting spent pulping liquor to combustion with air in a fluidized bed reaction chamber provided with a plurality of solid particulate materials, said chamber providing:
   (a) an entrained fluidized-bed in a first space region containing a first relatively fine solid bed particle;
   (b) a second relatively dense fluidized-bed in a second more limited space region containing relatively coarse solid bed particles;
   (c) a recirculation path for the first particle component from the first space region through the dense fluidizied-bed in the more limited space region wherein means are provided for removing a portion of the fine particle solids from the upper portion of the reaction chamber, conveying said removed solids to and passing said removed solids through a fluidized-bed containing heat-exchanger means for removing heat values from said removed solids and means for reintroducing said removed solids into the fluidized-bed reaction chamber below the surface of said second relatively dense fluidized-bed; and
   (d) said first and second fluidized-beds containing a minimal quantity of particle sizes intermediate between the average particle size of said first fluidized-bed and the average particle size of said second fluidized-bed;
wherein the improvement comprises the particles of both the first and second fluidized-beds consisting substantially of combustion residue salts of the combustion of spent pulping liquor in air.

7. The improved apparatus of claim 6 wherein the spent pulping liquor is Kraft black liquor.

* * * * *

UNITED STATES PATENT AND TRADEMARK OFFICE
CERTIFICATE OF CORRECTION

PATENT NO. : 4,522,685         Page 1 of 2

DATED      : June 11, 1985

INVENTOR(S): HERMAN F. FELDMANN

Figure 1:
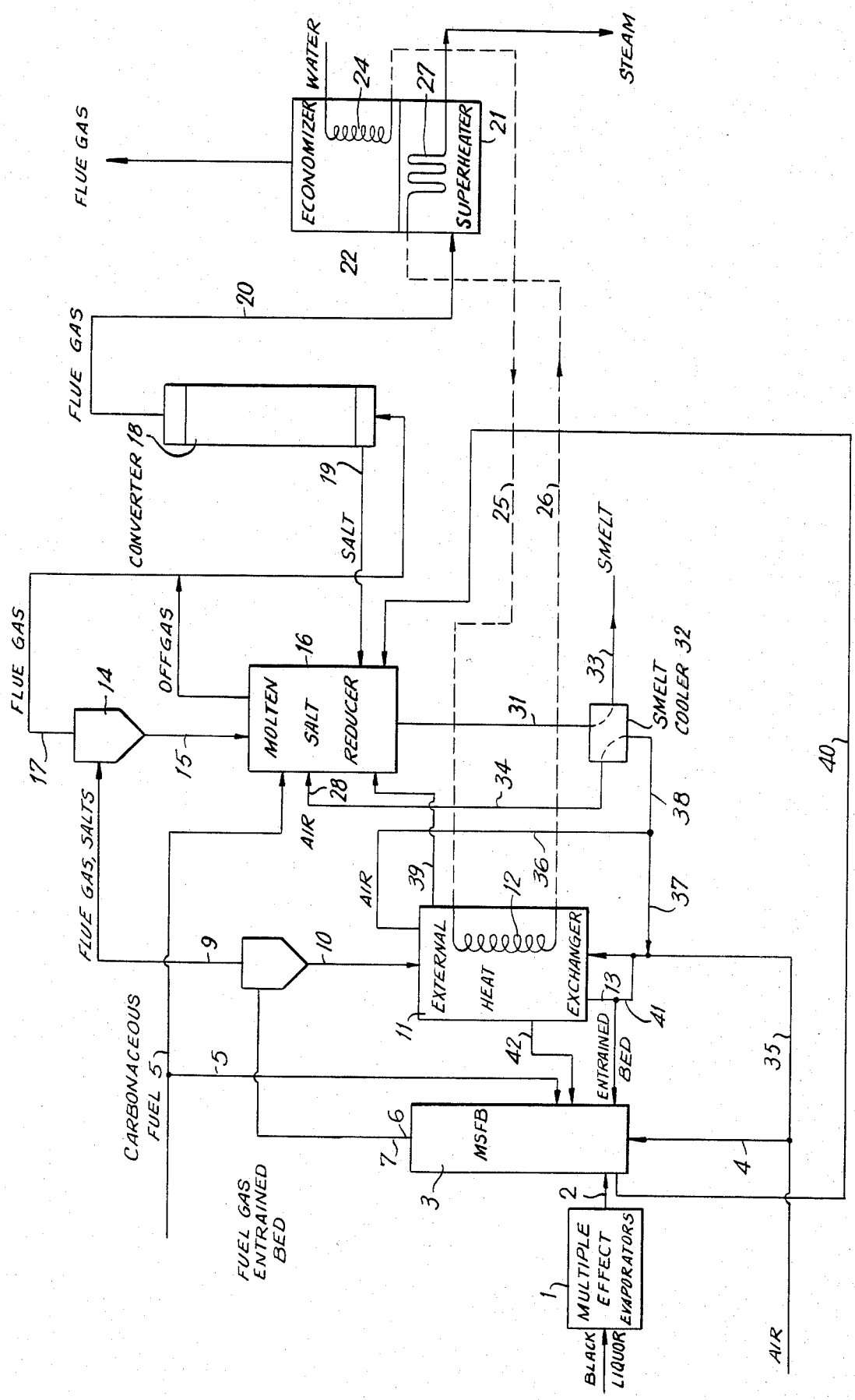
FIG. 1: Is a schematic diagram representing an apparatus and process for the recovery of heat and chemical values from spent pulping liquors.

It is certified that error appears in the above-identified patent and that said Letters Patent is hereby corrected as shown below:

On the Title Page:

Figure 1 should read as shown on the attached sheet.

Column 4, lines 43, 44, delete "conbustion" and insert -- combustion --.

Column 11, line 23, delete "fluidizied" and insert -- fluidized --.

Signed and Sealed this

Fifth Day of November 1985

[SEAL]

Attest:

Attesting Officer

DONALD J. QUIGG

Commissioner of Patents and Trademarks